United States Patent
Charmes et al.

(10) Patent No.: US 6,355,203 B1
(45) Date of Patent: Mar. 12, 2002

(54) METHOD OF OBTAINING, REPAIRING OR RECONSTRUCTING AN OBJECT, WITH A COMPOSITE PART OF MATERIAL

(75) Inventors: Michel Charmes, Saint Didier au Mont d'Or; Bruno Comoglio, Reyrieux, both of (FR)

(73) Assignee: Sunkiss Aeronautique, Sathonay Camp (FR)

( * ) Notice: Subject to any disclaimer, the term of this patent is extended or adjusted under 35 U.S.C. 154(b) by 0 days.

(21) Appl. No.: 09/292,945

(22) Filed: Apr. 16, 1999

(30) Foreign Application Priority Data

Apr. 17, 1998  (FR) .............................. 98 05052

(51) Int. Cl.$^7$ ..................... B29C 73/02; B29C 73/04; B29C 73/34

(52) U.S. Cl. ............... 264/493; 264/494; 264/496; 264/36.18; 264/36.22; 264/510; 264/511; 156/94; 156/98; 156/275.5; 156/286

(58) Field of Search ......................... 264/493, 494, 264/510, 511, 496, 154, 36.1, 36.18, 36.22; 156/94, 98, 275.5, 286

(56) References Cited

U.S. PATENT DOCUMENTS

| | | | |
|---|---|---|---|
| 2,439,083 A | | 4/1948 | French |
| 3,383,265 A | | 5/1968 | Garabedian |
| 3,912,542 A | * | 10/1975 | Hirano et al. ............... 156/104 |
| 4,243,368 A | | 1/1981 | Garabedian |
| 4,352,707 A | | 10/1982 | Wengler et al. |
| 4,824,500 A | * | 4/1989 | White et al. .................. 156/94 |

(List continued on next page.)

FOREIGN PATENT DOCUMENTS

| | | |
|---|---|---|
| DE | A-2149985 | 4/1973 |
| DE | A-0228719 | 7/1987 |
| DE | A-4019744 | 1/1992 |

(List continued on next page.)

OTHER PUBLICATIONS

E. Heitz, "Die Reparatur von Sandwichbauteilen," Plastverarbeiter, vol. 28, No. 9, 1977, pp. 469–476.

M.A. Dibble, "Shaping the Future of Flight," Machine Design, vol. 62, No. 10, May 24, 1990, pp. 70–77.

S. Dastin, "Repairing Advanced Composite Materials," Machine Design, vol. 58, No. 4, Feb. 1, 1986, pp. 86–90.

Primary Examiner—Jan H. Silbaugh
Assistant Examiner—Stefan Staicovici
(74) Attorney, Agent, or Firm—Oliff & Berridge, PLC

(57) ABSTRACT

A process for reconstituting or reconstructing a composite object having a defect which affects at least its surface includes: (a) placing at least one added piece or material, the shape and dimensions of which are matched to those of the defect, in or on the defect, the piece or material including mechanically strong, continuous or staple fibers; (b) placing a polymer material in or on the defect to obtain a plastic matrix in which the fibers are distributed; (c) placing a gas-drain for draining the gases given off by the plastic matrix and a cover for extracting the gases, in succession and one on top of the other, on the added piece, which together with the rest of the object form an enclosure which is sealed with respect to the external atmosphere and circumscribes the defect and the added piece; and (d) while evacuating the sealed enclosure, heating the added piece using a radiant source, the emission from which includes infrared radiation, and placing the source with respect to the defect so as to irradiate the cover for extracting the gases given off by the plastic matrix. Wherein, the composite object including a cellular layer, a first resin is deposited at the bottom of the defect, a cellular replacement part is then inserted, a second resin is deposited on the exposed part of the cellular part together with at least one piece of a fabric of the continuous or staple fibers, and at least one operation consisting of (c) and (d) is carried out, such that the radiant source has an effect beyond the cellular layer.

17 Claims, 2 Drawing Sheets

U.S. PATENT DOCUMENTS

| | | | | | |
|---|---|---|---|---|---|
| 4,855,173 | A | * | 8/1989 | Dore | 428/63 |
| 4,978,404 | A | * | 12/1990 | Westerman, Jr. | 156/98 |
| 5,002,476 | A | | 3/1991 | Kerr | |
| 5,166,007 | A | * | 11/1992 | Smith et al. | 428/63 |
| 5,190,611 | A | * | 3/1993 | Cologna et al. | 156/98 |
| 5,332,536 | A | * | 7/1994 | Boeckeler | 264/22 |
| 5,395,718 | A | * | 3/1995 | Jensen et al. | 430/5 |
| 5,518,565 | A | * | 5/1996 | Castellucci et al. | 156/94 |
| 5,601,676 | A | * | 2/1997 | Zimmerman et al. | 156/98 |
| 5,618,606 | A | * | 4/1997 | Sherrick et al. | 428/113 |
| 5,746,967 | A | * | 5/1998 | Hoy et al. | 264/406 |
| 5,972,141 | A | * | 10/1999 | Ellyin | 156/94 |

FOREIGN PATENT DOCUMENTS

| | | |
|---|---|---|
| EP | A-0147340 | 7/1985 |
| EP | 0 263 094 A | 4/1988 |
| EP | 0 839 635 A | 5/1998 |
| FR | A-2693147 | 1/1994 |
| FR | A-2750914 | 12/1994 |
| GB | A-2241194 | 8/1991 |

* cited by examiner

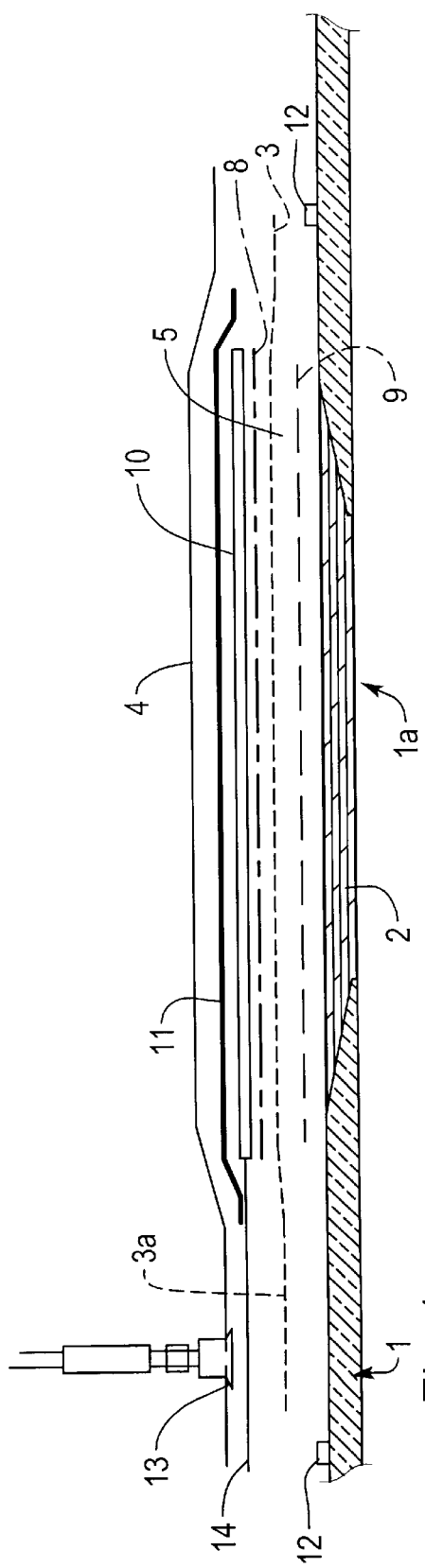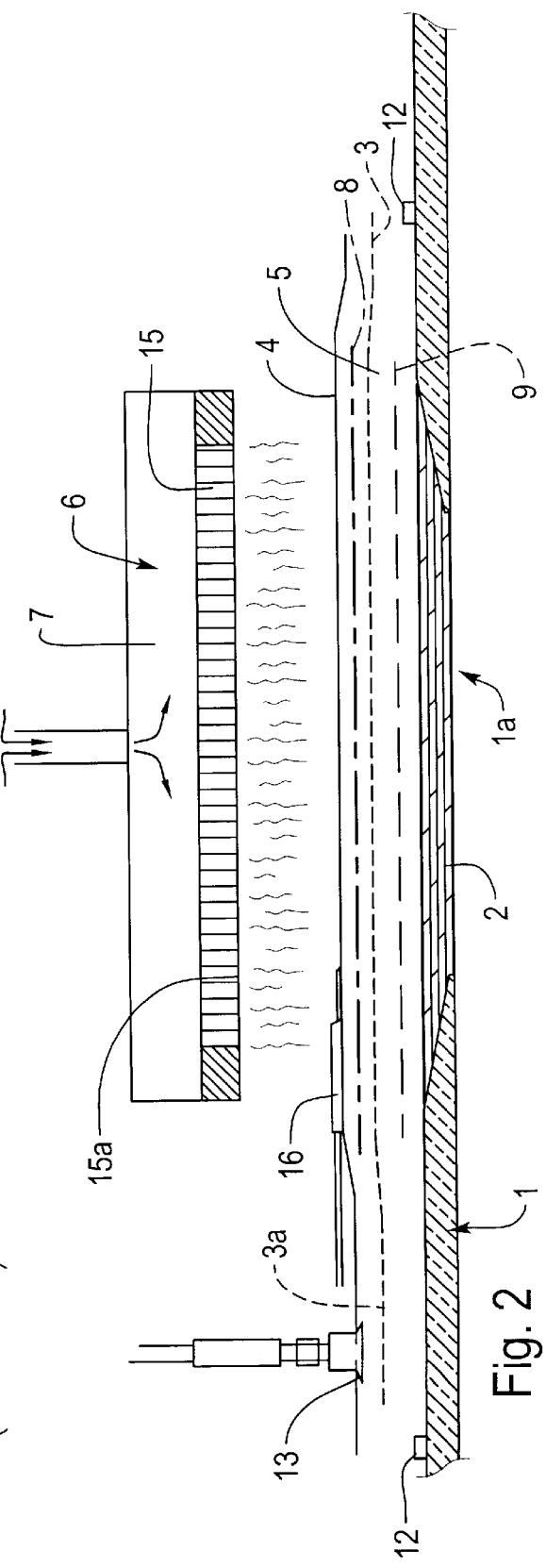

METHOD OF OBTAINING, REPAIRING OR RECONSTRUCTING AN OBJECT, WITH A COMPOSITE PART OF MATERIAL

BACKGROUND OF THE INVENTION

The present invention relates mainly to the reconstitution or reconstruction of an object, especially of an object or component which is a composite or made of a composite material, which has a defect, to be treated or repaired, which affects at least its surface or even its entire thickness.

More specifically, the invention relates to the reconstitution or reconstruction or repair of objects as defined above by placing in or on the said defect, on the one hand, mechanically strong, continuous or staple fibres which are organized, for example in the form of a web or technical fabric, or are not organized, for example loose or in the form of a nonwoven, and, on the other hand, a polymeric material or resin (a single resin or a polymer alloy) which is thermoplastic or crosslinkable, especially thermocrosslinkable or thermosetting, this all forming, in the solid state, a matrix in which the said fibres are distributed or spread. By way of example, the fibres are glass, carbon or kevlar fibres, and the resin is an epoxy or polyester or phenolic or bismaleimide resin. These fibres may be put into the defect separately from the resin, in which case the said fibres are placed in the said defect, for example, in the form of superposed layers of fabric, and then the resin is injected into the mass of fabric in liquid form, or concomitantly, in which case a ready-to-use composite material is used, for example a prepreg material having a reinforcement consisting of the aforementioned fibres and a matrix of the resin, for example a partially crosslinked or uncrosslinked resin.

In both cases, the structure obtained on or in the defect is called monolith or monolithic, since it forms one piece in the solid state, without it being possible in practice to separate, for example by delamination, the aforementioned components, namely the fibres or layers on the one hand and the resin on the other.

For the purposes of the present description, and in the claims, unless otherwise indicated the term "composite" refers to a structure, an object or a material consisting in a uniform manner of the assembly of several elementary materials or components, namely and especially fibres and resins, bonded together, and together having properties, especially mechanical properties, that no component has just by itself.

In practice, throughout the present description, the term "resin" refers to polymeric materials, which may be qualified, as is customary, by the term of adhesive or glue, for example a structural adhesive, whether these be thermoplastic or thermosetting plastics.

According to document DE-A-4,019,744, and more particularly according to the embodiment in FIG. 7 of that document, a process has been described for reconstituting or reconstructing an object, for example a composite object, having a defect which affects at least its surface. According to that process:

a—at least one added piece or material, the shape and dimensions of which are matched to those of the said defect, is placed in or on this defect, this piece or this material comprising mechanically strong, continuous or staple fibres which may or may not be organized; for example, a superposition of fabric layers, collecting the mechanically strong fibres in an organized manner, is placed in this defect.

b—a polymer material, or resin, is placed in or on this defect in order to obtain a plastic matrix in which these fibres are distributed; for example, this polymer material is brought into the defect in liquid form and under pressure, thus impregnating the aforementioned fibres and obtaining, after the polymer material has cured, a solid plastic matrix in which these fibres are distributed, c—a gas-draining means, for draining the gases given off by the plastic matrix during step (d) below, and a gas-extraction cover are placed, in succession and one on top of the other, on the added piece that was impregnated with the plastic matrix, which together with the rest of the object being reconstructed or repaired form an enclosure which is sealed with respect to the external atmosphere and circumscribes the defect and the added piece; by way of example, the venting means consists of a gas-draining textile web, d—while evacuating the sealed enclosure, the added piece is heated using a radiant source, the emission from which comprises infrared radiation, and placing this source with respect to the aforementioned defect so as to irradiate the cover for extracting the gases given off by the plastic matrix.

Document DE-A-4,019,744 has described the abovementioned process only for treating or repairing solid objects made of one and the same material, to the exclusion of any other object.

Moreover, at the present time, in order to repair a monolithic composite object, for example in the aeronautical industry, the process employed is carried out in the following manner, with reference to FIG. 1 which is an exploded and diagrammatic view:

one or more pieces 2, or a material, the shape and dimensions of which are matched to those of the defect 1*a* to be repaired or filled, are prepared, especially by cutting; this material or these pieces, either assembled or superimposed one with respect to another, are themselves made of a composite material in the sense in which they combine, in a bonded manner, a plastic matrix and mechanically strong, continuous or staple fibres which may or may not be organized, for example made of carbon, kevlar, glass, etc. . . . ;

the piece or pieces 2, or the material thus prepared, is or are added in or on the defect 1*a* in the treated object;

the following are placed in succession on the piece 2 and on the object 1, on each side of the defect and one on top of another:

a perforated or unperforated film 9, which does not adhere to the subsequently treated, for example crosslinked, added piece 2;

a gas-draining textile web 3 for draining, via it peripheral border 3*a*, the gases which will be given off by the plastic matrix during its treatment, for example its crosslinking;

a film 8 impermeable to the plastic;

a cover-shaped flexible heating structure 10 having, in general, electrical heating elements embedded in an electrically insulating material, for example a silicone;

a layer 11 for thermal insulation with respect to the outside;

and a flexible gas-extraction cover 4, forming, using suitable means 12 (for example seals), with the rest of the object 1 an enclosure 5 which is sealed with respect to the external atmosphere; this enclosure circumscribes not only the defect 1*a* and the added piece 2, but also all the superimposed elements described above.

The extraction cover 4 is evacuated, for example using a pump 13, and the flexible heating structure is connected to an electrical supply 14.

Using suitable control means, especially temperature sensors, the plastic matrix is thermally treated, for example thermally crosslinked, in the case in which the said plastic matrix is a crosslinkable or thermosetting polymer. The heat treatment is closely controlled, especially depending on the nature of the plastic matrix and on the desired mechanical performance.

SUMMARY OF THE INVENTION

The present invention relates to the reconstitution or reconstruction of composite objects, of the sandwich type, i.e. object having a solid cellular layer, for example a material of the "honeycomb" type, made of various materials such as board impregnated with a phenolic resin, made of plastic, or made of metal, or made of a structural plastic foam. This cellular layer is bonded, in a structural manner, at least on one side to a monolithic layer, as defined above, that is to say combining, in a monobloc manner, a plastic matrix and mechanically strong fibres distributed in the said matrix.

At the present time, no satisfactory solution exists, or even any solution at all, for repairing or reconstructing sandwich-type composite objects, particularly when only one face of the said object is accessible.

In practice, in order to reconstruct or reconstitute such an object, for example the upper surface part of an aircraft wing having a sandwich composite structure, the defect is firstly machined in order to give it a regular or controlled geometry. A resin or an adhesive is then placed at the bottom of the machined defect, followed by an added piece made of cellular material, this piece being fitted into the cellular layer of the object to be repaired, together with a resin for bonding to the rest of the cellular layer; and finally mechanically strong fibres and a plastic matrix are placed on the monolithic layer of the object to be repaired, in order to reconstitute the said layer at the defect.

The heat supply and the pressure that are required to bond and assemble all of the materials or pieces filling the defect, and those materials or pieces to the rest of the object to be reconstituted or reconstructed, are obtained by a procedure carried out once or several times, according to the following operating steps:

a gas-draining textile web, for draining, via its peripheral border, the gases given off by the plastic matrix during the step below, a cover-shaped flexible heating structure, having electrical heating elements embedded in an electrically insulating material (for example a silicone), and a cover for extracting the said gases are placed, in succession and one on top of the other, on the repaired object at the defect, which together with the rest of the object form an enclosure which is sealed with respect to the external atmosphere and circumscribes the defect and the pieces and materials which have been added thereto;

while evacuating the sealed enclosure, the added pieces and materials, together with the flexible heating structure, are heated in order, in the case of a thermocrosslinkable resin, to generate or initiate the crosslinking of the plastic matrix.

In the case of a composite object having one face inaccessible, for example the inner face, there are no solutions for thermally treating the resin at the bottom of the defect other than:

by overheating, using the flexible heating structure, around the core of the defect in order to try to thermally reach the inner face; but such overheating, apart from the fact that it is not very effective, is liable to damage the outer face of the object to be repaired; or else the flexible heating structure, or the object, has to be cooled around the periphery removing the object, in order to gain access to its inner face, or replacing the object to be repaired, something which in some cases is not possible, or is at the very least economically punitive.

In the first case, when the required temperature cycle for crosslinking the resin at the bottom of the defect is not provided, this crosslinking does not take place or is imperfect, in such a way that the entire reconstruction of the object is compromised.

The essential object of the present invention is therefore to find a solution to the reconstruction or reconstitution of a composite object of the sandwich type.

According to the present invention, contrary to all expectations, it has been discovered that the use of a radiant source emitting infrared radiation, placed with respect to the defect to be treated so as to irradiate the cover for extracting the gases given off by the plastic matrix, made it possible to heat beyond the cellular layer of the sandwich composite object, with respect to the said extraction cover, this being so notwithstanding the thermal resistance normally presented by any cellular layer.

According to the invention, when the composite object comprises a solid cellular layer, for example of the honeycomb type, a first resin is deposited at the bottom of the defect, a cellular replacement part, for example of the honeycomb type, is then inserted, a second resin is deposited on the exposed part of the aforementioned cellular part together with at least one piece of a fabric of continuous or staple fibres, and at least one step consisting of the following operations is carried out:

a gas-draining means, for example a textile web, for draining the gases given off by the plastic matrix during the step below, and a cover for extracting the said gases are placed, in succession and one on top of the other, on the added piece, which together with the rest of the object form an enclosure which is sealed with respect to the external atmosphere and circumscribes the defect and the added piece, while evacuating the sealed enclosure, the added piece, especially the cellular replacement part, is heated only using a radiant source emitting infrared radiation, and placing the said source with respect to the treated defect so as to irradiate the cover for extracting the gases given off by the plastic matrix.

The present invention also relates to the following methods of implementation:

The process for reconstituting or reconstructing the treated object comprises a single step, in which case, for example, the first resin requires a treatment temperature, for example a crosslinking temperature, which is lower than the treatment temperature, for example the crosslinking temperature, for the second resin.

The same process may be carried out in two steps, namely a first step during which a resin is deposited at the bottom of the defect, the cellular replacement part, for example in honeycomb form, is inserted and the two operations defined above are carried out; and a second step in which this resin, i.e. the same resin, is applied to the exposed upper part of the cellular part and the two operations described above are carried out again.

Preferably the piece of fabric associated with the second resin which comprises the second resin forming a plastic matrix in which the continuous or staple fibres are distributed.

The resin, or each resin, is a thermocrosslinkable or thermoplastic polymer material.

The infrared radiation has a wavelength lies within a range of between 1 and 10 microns. By way of example, the radiant source comprises at least one catalytic burner.

The extraction cover is made from at least one material which is relatively transparent with respect to infrared radiation, for example made of polyamide.

Preferably, the first resin is deposited at the bottom of the defect with at least one other piece of a fabric of continuous or staple fibres; by way of example, the other piece of fabric is a composite, for example a prepreg, as it comprises the first resin forming a plastic matrix in which the continuous or staple fibres are distributed.

Preferably, the treated composite object of the sandwich type comprises the cellular layer between two monolithic layers.

The cellular layer and the cellular replacement part, i.e. the defect-filling cellular part, are made of a cellular material, for example a structural plastic foam, for example made of epoxy resin.

By way of indication, the gas-draining means may be a mesh, for example made of metal.

BRIEF DESCRIPTION OF THE DRAWINGS

The present invention will now be described with reference to the appended drawing in which:

FIG. 1 shows, in an exploded manner an assembly as obtained by using a reconstitution or reconstruction process according to the prior art;

FIG. 2 shows, again in an exploded view, an assembly as obtained by using a reconstitution or reconstruction process according to the invention, as it will then be applied according to the invention to a composite object of the sandwich type;

DETAILED DESCRIPTION OF THE PREFERRED EMBODIMENTS

Figure 3:
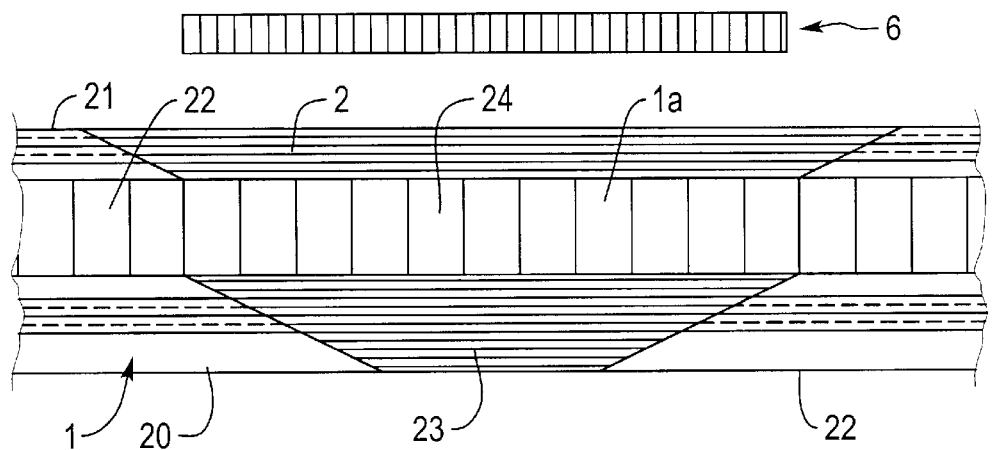
FIG. 3 shows a sandwich-type composite object reconstituted according to the present invention.

According to FIG. 2, the object to be repaired, reconstituted or reconstructed, made of a composite material, is labelled by the reference number 1. This is, for example, a wall forming part of the wing of an aircraft. As a result of an accidental impact for example, this composite object has a defect 1a, in this case a hole, which it is necessary to fill so as to reconstitute the initial object. The hole is firstly cut or recut in a regular and predetermined manner.

For this purpose, one or more pieces 2, which are made of a composite material, are cut out, superimposed and put into the defect 1a in order to fill it, so as to create, once the object has been repaired, both an outer and an inner continuous surface. Each piece 2 consists of a composite material, as it comprises a plastic matrix of at least one polymer material, for example a crosslinkable polymer material, in which mechanically strong, continuous or staple fibres are distributed, for example carbon fibres; these are, for example, pieces of technical fabric and/or of prepreg. These fabrics and/or prepregs may be placed alternately one on top of another. Suitable carbon-fibre fabrics are available under various names, for example from the company BROCHIER (France) under the name G801, and suitable prepregs are available, for example from the company HEXCEL (France) under the name REDUX 312L.

These pieces are therefore placed in the hole 1a, as shown in FIG. 2, together with a curable resin, for example the plastic matrix of at least one crosslinkable polymer material already mentioned. Such resins are available from various companies, for example from STRUCTIL (France), especially under the name EA9396.

The following are placed, in succession and one on top of another, on the added piece or pieces 2:

a perforated or unperforated film 9, which does not adhere to the added piece 2, once the latter has crosslinked;

a textile web 3 for draining gases via its peripheral border 3a, namely gases given off by the plastic matrix during the crosslinking step;

a film 8 impermeable to the fluid plastic material, i.e. that of the matrix of the pieces 2;

and, finally, a gas-extraction cover 4 which together with the rest of the object 1 forms an enclosure 5 which, by virtue of the seal 12, is sealed with respect to the external atmosphere; this enclosure circumscribes the defect 1a and the added piece 2.

According to the present invention, the added piece 2 is heated using an infrared radiant source 6, for example a catalytic burner 7, emitting infrared radiation having a wavelength spectrum of between 1 and 10 microns, and by placing this source with respect to the defect 1a so as to irradiate the gas-extraction cover 4, the latter being, moreover, compressed because of the evacuation of the enclosure 5 defined above. Unlike the illustration in FIG. 1, the flexible heating structure 10 and the thermal insulation layer 11 are no longer used.

The catalytic burner 7 is designed in a manner known per se. It is a burner allowing a mixture of oxidizer air and a fuel gas to be burnt by catalytic combustion, this mixture passing through an inert and refractory support 15, which is perforated or permeable, comprising a combustion catalyst. It is from the external face 15a of this support 15 that the infrared radiation is emitted towards the gas-extraction cover 4.

Preferably, the extraction cover 4 is made from at least one material which is relatively transparent with respect to the infrared radiation emitted by the source 6, for example made of polyamide or polyimide.

The extraction cover 4 may be placed directly in contact with the draining textile web 3. Moreover, control means 16, for example temperature probes, are placed inside and/or outside the extraction cover 4 so as to control the thermal treatment process, for example the crosslinking of the plastic matrix of the added piece 2.

Many other infrared radiation sources may be employed, as long as the radiation emitted meets with the requirements described above. Thus, an electrical infrared radiation generator, in accordance with document EP-A-0,147,340 may be used.

According to the present invention, it is possible to repair a defect, for example in an aircraft wing having a composite structure of the sandwich type comprising a honeycomb, or any other cellular filling material, in the following manner:

a curable resin, for example the resin EA9396 already mentioned, is placed at the bottom of the defect and a honeycomb replacement part is inserted;

the process then continues as described with reference to FIG. 2, in order to carry out the treatment, for example the curing or crosslinking of the resin, so that the replacement honeycomb is held within the structure, i.e. by placing the film 9, the web 3 and the cover 4 one on top of another, by creating a vacuum and by providing an infrared radiant source over the object to be repaired;

after cooling, the same resin or the prepreg is again applied to the exposed upper part of the honeycomb and the process is carried out as described with reference to FIG. 2, so as to completely integrate the honeycomb into the composite structure;

a finishing step is carried out in order to make the upper surface even.

For this example, it is also possible to carry out only a single repair step, by choosing two different resins, a first resin, requiring a lower treatment or curing temperature, being placed at the bottom of the defect, followed by the replacement honeycomb, and the second resin, having a higher treatment or curing or crosslinking temperature, being placed on the honeycomb together with the fabrics or prepregs, so that the temperature created by the infrared radiant source is sufficient to cure the whole, assembly in just one step, the heat applied being less inside the defect than around the outer surface of the latter.

The process described above was discovered, and validated as regards its effectiveness, by the experimental protocol described below with reference to FIGS. 4 and 5.

Figure 4:
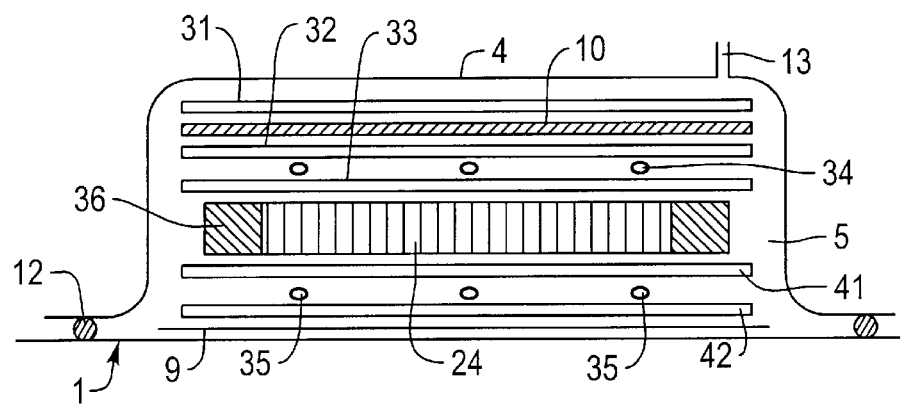
FIGS. 4 and 5 show an experimental set-up which has made it possible to demonstrate the effectiveness of infrared radiation, firstly through a gas-extraction cover and secondly beyond a cellular layer which may form part of a composite object; according to these figures, the numerical references common to those in FIGS. 1 to 3 identify the same elements or components, or elements or components which, although different, have the same functions.

The experimental set-up shown in FIG. 4 is controlled and run by means of an operation and control box, called ANITA, reference AN 8501, and as available in France from the company GMI, 204, Boulevard Saint Germain 75007 -PARIS.

Starting from a flat support or object 1, the following are superimposed, from bottom to top:

a perforated or unperforated film 9, for example a nonstick fabric coated with Teflon®, two pieces 41 and 42 of prepreg fabric, this fabric being sold by the company HEXCEL under the reference HEXCEL 1581 ES 36 D 50% (corresponding to a glass fabric of reference 1581 from the same company, embedded in a matrix of epoxy resin of reference ES 36 D from the same company, the weight of resin corresponding to 50% of the total weight of the prepreg fabric), measurement thermocouples 35 placed between the two pieces 41 and 42, a rectangular piece of a honeycomb structure, placed inside a metal frame 36, made of a material called NOMEX as manufactured and sold by the United States company DUPONT DE NEMOURS and corresponding to a paper honeycomb impregnated with a meta-aramid aromatic polyamide resin; the honeycomb structure has a thickness of 55 mm and the cells of hexagonal shape have dimensions 6×5×3 mm, two textile webs 32 and 33, for example of a nonwoven plastic material, between which webs thermocouples 34 are inserted, a flexible heating structure 10, having electrical resistance elements embedded in an insulating material, for example made of silicone, a venting web 31 above the flexible heating structure 10, the same venting web 32 being placed beneath this structure, and, to conclude, a flexible gas-extraction cover 4, which forms a sealed enclosure 5 containing all of the elements or components described above, this being achieved by virtue of seals 12 between this cover and the support or object 1.

Figure 5:
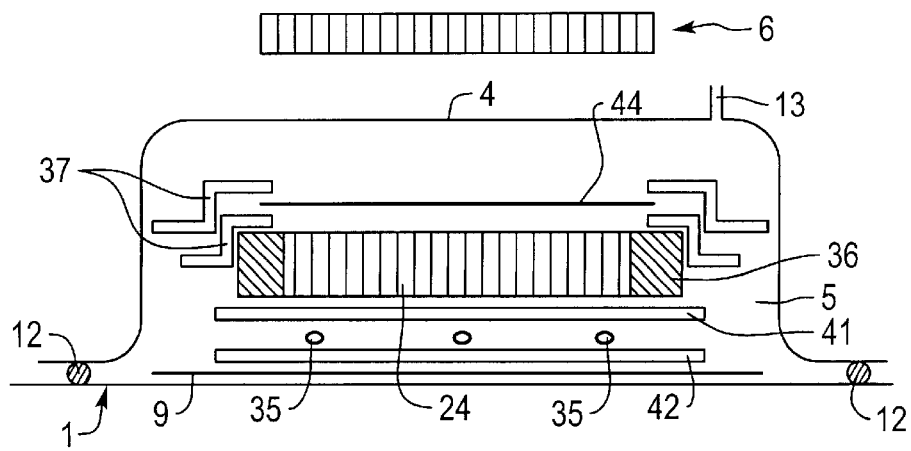

In contrast, according to FIG. 5, the experimental set-up shown in this figure no longer comprises the flexible heating structure 10 and the gas-draining webs 31 and 32, nor the regulating thermocouples 34. The draining means consists of a metal mesh 44 placed above the upper face of the honeycomb piece 24. This metal mesh is supported by a frame 37 consisting of two elements or borders made of nonwoven material, gripping the periphery of the metal mesh 44. The flexible heating structure 10 is replaced with an infrared radiant source 6 placed outside the flexible cover 4 and radiating towards the latter.

The structure of the honeycomb piece 24 has a thickness of 55 mm and cells of hexagonal shape (5×3×6 mm).

Apart from the abovementioned differences, all the other positional and operating parameters remain the same.

Using the set-up in FIG. 4, in accordance with the instructions provided by the supplier of the prepreg fabric, the flexible heating structure 10 is programmed in a temperature cycle comprising:

a rise of 2.5° C./minute for approximately 40 minutes a plateau at 120° C. for 90 minutes a temperature fall after 130 minutes.

Using the thermocouples 35, it is found that, throughout the cycle defined above, the temperature of the prepreg fabric did not exceed 30° C. while the thermocouples 34 indicate, given the piece 24, a temperature of about 110° C.

Under these conditions, it is impossible for the plastic matrix of the prepreg fabric 41 to cure properly since, with a set temperature of 120° C. (corresponding to the temperature plateau), a slightly softened prepreg which is still very flexible is barely obtained. In particular, it remains easy for the piece of prepreg fabric 41 to debond from the honeycomb piece 24. Given the maximum temperature of 30° C. mentioned above, no sign of curing can therefore be detected.

Using the set-up in FIG. 5, the infrared radiant source is placed approximately 400 mm above the extraction cover 4. This is an RX catalytic thermoreactor, as sold by the company SUNKISS, the infrared radiation having the following characteristics:

power radiated per unit area: between 20 and 50 kw/m$^2$ infrared radiation having a wavelength lying between 1 $\mu$m and 10 $\mu$m.

Already, by operating the radiant source, effective heating is observed at the pieces 41 and 42, that is to say observed from the thermocouples 25 thereby making it possible to regulate the temperature at the prepreg pieces themselves, something which is not possible according to the set-up in FIG. 4.

The temperature at the pieces 41 and 42 may therefore be controlled by acting on the radiant source, in order to vary the temperature, in a more or less similar manner to the cycle required for crosslinking the plastic matrix, by obtaining, in particular, a temperature plateau at 120° C., and even above this if so desired.

At the end of the test, it is observed that the plastic matrix of the prepreg pieces 41 and 42 is cured in a visibly homogeneous manner, and has a dry feel. The monolithic sheets obtained are rigid and solidly bonded to the honeycomb piece 24.

Consequently, an infrared radiant source allows a prepreg to be cured through a honeycomb, something which is impossible using just a flexible heating structure, given the comparison between the two tests carried out.

The same experiment as that mentioned above may be carried out again, with similar results, using other types of honeycomb material, for example made of aluminium, reference Derenid, sold by the French company EDERENA CONCEPT.

By virtue of the invention, and according to FIG. 3, it becomes possible to reconstruct or reconstitute a sandwich composite object comprising a cellular layer 22 of the honeycomb type, between two monolithic layers 21 and 20. To do this, the defect 1a is firstly machined, in order to define a chamfered hole in the monolithic layer 20, a cylindrical hole in the cellular layer 22 and again a chamfered hole in the monolithic layer 21. Several pieces 23, cut from a prepreg fabric, are superimposed in the chamfered hole in the monolithic layer 20. A honeycomb piece 24 is then placed in the cylindrical hole in the cellular layer 22, for example using a curable resin. Finally, several pieces 2, cut from a prepreg fabric, are superimposed in the chamfered hole in the monolithic layer 21. By virtue of all these pieces, the defect 1a is completely filled so as to be flush both with the upper face of the object 1 and with its lower face.

Next, at the upper monolithic layer 21, circumscribing the defect 1a, the operations previously described with reference to FIG. 2 are carried out in one or more steps.

What is claimed is:

1. A process for reconstituting or reconstructing a composite object having a sandwich structure and comprising a first monolithic layer, a cellular layer bonded on the first monolithic layer, and a second monolithic layer bonded on the cellular layer, the composite object having a defect extending through the second monolithic layer, the cellular layer and into the first monolithic layer, the process comprising the steps of:

(a) placing a first resin in the defect in the first monolithic layer of the composite object, the first resin filling the defect in the first monolithic layer;

(b) placing a cellular replacement part on an exposed portion of the first resin in the defect in the cellular layer of the composite object the cellular replacement part filling the defect in the cellular layer;

(c) placing a second resin and at least one piece of material comprising mechanically resistant continuous or staple fibers on an exposed portion of the cellular replacement part in the defect in the second monolithic layer of the composite object, so as to form a second resin matrix in which the fibers are distributed, the second resin and the at least one piece of material filling the defect in the second monolithic layer;

(d) placing a cover on at least the second monolithic layer to form a sealed enclosure circumscribing the defect and at least the first resin and the cellular replacement part; and (e) irradiating and heating with a radiant source the cover and at least the first resin and the cellular replacement part with infrared radiation, the infrared radiation curing at least the first resin, and extracting through the cover the gases given off by at least the first resin during step (e).

2. The process according to claim 1, wherein:
   step (d) comprises placing the cover on the first resin, cellular replacement part, and second resin and mechanically resistant fibers; and
   step (e) comprises evacuating the gases given off by the first resin matrix and the second resin matrix from the sealed enclosure.

3. The process according to claim 1, comprising:
   during step (d) placing the cover on only the first resin and cellular replacement part;
   then performing step (e);
   after cooling, placing the second resin and mechanically resistant fibers on the exposed portion of the cellular replacement part cured with the first resin; and
   then repeating step (e).

4. The process according to claim 1, wherein the first resin has a curing temperature that is lower than a curing temperature of the second resin.

5. The process according to claim 1, wherein the radiant source is a catalytic burner which irradiates at least the first resin and the cellular replacement part through the cover.

6. The process according to claim 1, wherein the cover comprises at least one material through which infrared radiation passes.

7. The process according to claim 1, wherein step (a) comprises placing the first resin and mechanically resistant continuous or staple fibers at the bottom portion of the defect in the first monolithic layer of the composite object, the first resin forming a first resin matrix in which the fibers are distributed.

8. The process according to claim 1, wherein step (d) comprises placing a gas-draining member under the cover to drain the gases given off by at least the first resin during the step (e).

9. The process according to claim 1, wherein the cellular layer of the composite object and the cellular replacement part each have a honeycomb structure.

10. A process for reconstituting or reconstructing a composite object having a sandwich structure and comprising a first monolithic layer, a cellular layer bonded on the first monolithic layer, and a second monolithic layer bonded on the cellular layer, the composite object having a defect extending through the second monolithic layer, the cellular layer and into the first monolithic layer, the process comprising the steps of:

(a) placing a first resin and at least one piece of material comprising mechanically resistant continuous or staple first fibers in the defect in the first monolithic layer of the composite object, the first resin and at least one piece of material filling the defect in the first monolithic layer and forming a first resin matrix in which the first fibers are distributed;

(b) placing a cellular replacement part on the first resin and first fibers in the defect in the cellular layer of the composite object, the cellular replacement part filling the defect in the cellular layer;

(c) placing a second resin and at least one piece of material comprising mechanically resistant continuous or staple second fibers on the cellular replacement part in the defect in the second monolithic layer of the composite object, so as to form a second resin matrix in which the second fibers are distributed, the second resin and the at least one piece of material filling the debet in the second monolithic layer;

(d) placing a cover on at least the second monolithic layer to form a sealed enclosure circumscribing the defect and at least the first resin matrix and the cellular replacement part; and (e) irradiating and heating with a radiant source at least the cover and the first resin matrix and the cellular replacement part with infrared radiation, the infrared radiation curing at least the first resin, and extracting through the cover the gases given off by at least the first resin during step (e).

11. The process according to claim 10, wherein the first resin has a curing temperature that is lower than a curing temperature of the second resin.

12. The process according to claim 10, wherein the first resin and the second resin are the same material.

13. The process according to claim 10, wherein the cellular layer of the composite object and the cellular replacement part each have a honeycomb structure.

14. A process for reconstituting or reconstructing a composite object having a sandwich structure and comprising a first monolithic layer, a cellular layer bonded on the first monolithic layer, and a second monolithic layer bonded on the cellular layers the composite object having a defect extending through the second monolithic layer, the cellular layer and into the first monolithic layer, the process comprising the steps of:

(a) placing at least one first prepreg each comprising a first resin and mechanically resistant continuous or staple first fibers in the defect in the first monolithic layer of the composite object, the at least one first prepreg forming a first resin matrix in which the first fibers are distributed;

(b) placing a cellular replacement part on the at least one first prepreg in the defect in the cellular layer of the composite object;

(c) placing at least one second prepreg comprising a second resin and at least one piece of material comprising mechanically resistant continuous or staple second fibers on the cellular replacement part in the defect in the second monolithic layer of the composite object, so as to form a second resin matrix in which the second fibers are distributed;

(d) placing a cover on at least the second monolithic layer to form a sealed enclosure circumscribing the defect and at least the first resin matrix and the cellular replacement part; and (e) irradiating and heating with a radiant source the cover and at least the first resin matrix and the cellular replacement part through said cover with infrared radiation, the infrared radiation curing the first resin and the second resin, and extracting through the cover the gases given off by at least the first resin.

15. The process according to claim 14, wherein the first resin has a curing temperature that is lower than a curing temperature of the second resin.

16. The process according to claim 14, wherein the first resin and the second resin are the same material.

17. The process according to claim 14, wherein the cellular layer of the composite object and the cellular replacement part each have a honeycomb structure.

* * * * *